US011866159B2

(12) United States Patent
Colombo et al.

(10) Patent No.: US 11,866,159 B2
(45) Date of Patent: Jan. 9, 2024

(54) ROTOR FOR A HOVER-CAPABLE AIRCRAFT

(71) Applicant: LEONARDO S.P.A., Rome (IT)

(72) Inventors: Attilio Colombo, Samarate (IT);
Gabriele Cazzulani, Samarate (IT);
Simone Cinquemani, Samarate (IT);
Ferruccio Resta, Samarate (IT);
Francesco Braghin, Samarate (IT)

(73) Assignee: LEONARDO S.P.A., Rome (IT)

( * ) Notice: Subject to any disclaimer, the term of this patent is extended or adjusted under 35 U.S.C. 154(b) by 185 days.

(21) Appl. No.: 17/619,107

(22) PCT Filed: May 26, 2020

(86) PCT No.: PCT/IB2020/054975
§ 371 (c)(1),
(2) Date: Dec. 14, 2021

(87) PCT Pub. No.: WO2020/250063
PCT Pub. Date: Dec. 17, 2020

(65) Prior Publication Data
US 2022/0258855 A1    Aug. 18, 2022

(30) Foreign Application Priority Data

Jun. 13, 2019 (EP) .................................. 19180113

(51) Int. Cl.
*B64C 27/00* (2006.01)
*B64C 27/06* (2006.01)
*B64C 27/46* (2006.01)

(52) U.S. Cl.
CPC ............ *B64C 27/001* (2013.01); *B64C 27/06* (2013.01); *B64C 27/46* (2013.01);
(Continued)

(58) Field of Classification Search
CPC ............ B64C 27/001; B64C 2027/003; B64C 2027/004; B64C 2027/005; B64C 2027/002
See application file for complete search history.

(56) References Cited

U.S. PATENT DOCUMENTS

| 5,647,726 A | * | 7/1997 | Sehgal ................. B64C 27/001 188/380 |
| 6,045,090 A | * | 4/2000 | Krysinsky ............ B64C 27/001 244/17.27 |

(Continued)

FOREIGN PATENT DOCUMENTS

| EP | 0 811 784 | 12/1997 |
| EP | 2 857 313 | 4/2015 |

(Continued)

*Primary Examiner* — Assres H Woldemaryam
*Assistant Examiner* — Anna L. Gordon
(74) *Attorney, Agent, or Firm* — Leason Ellis LLP

(57) ABSTRACT

A rotor for a hover-capable aircraft includes an attenuating device to attenuate the transmission of vibrations from a mast to the aircraft. The attenuating device includes a first mass free to oscillate parallel to a hub rotation axis with respect to a casing of the attenuating device and elastically connected to the casing. The attenuating device further includes a second mass free to oscillate parallel to the hub rotation axis, connection means adapted to make the first and second masses integrally movable along the hub rotation axis when the angular speed of the mast assumes a first value, and actuator means activatable to decouple the first and second masses when the angular speed of the mast assumes a second value, different from the first value.

15 Claims, 4 Drawing Sheets

(52) U.S. Cl.
CPC .. *B64C 2027/003* (2013.01); *B64C 2027/004* (2013.01); *B64C 2027/005* (2013.01)

(56) References Cited

U.S. PATENT DOCUMENTS

| | | | | |
|---|---|---|---|---|
| 6,891,286 | B2* | 5/2005 | Flanagan | H10N 35/00 |
| | | | | 310/12.24 |
| 8,435,002 | B2 | 5/2013 | Jolly et al. | |
| 2010/0296930 | A1 | 11/2010 | Girard et al. | |
| 2012/0298794 | A1* | 11/2012 | Krysinski | B64C 27/001 |
| | | | | 244/17.27 |
| 2013/0011260 | A1* | 1/2013 | Yoshizaki | B64C 27/001 |
| | | | | 310/20 |
| 2016/0325828 | A1 | 11/2016 | Jolly et al. | |
| 2017/0297689 | A1* | 10/2017 | Lauder | B64C 27/33 |
| 2017/0349271 | A1* | 12/2017 | Inquiete | F16F 15/03 |
| 2020/0001987 | A1* | 1/2020 | Choi | F16F 15/22 |

FOREIGN PATENT DOCUMENTS

| | | | | |
|---|---|---|---|---|
| EP | 3381798 | A1 * | 10/2018 | ........... B64C 27/001 |
| JP | 2009 138893 | | 6/2009 | |

* cited by examiner

ROTOR FOR A HOVER-CAPABLE AIRCRAFT

CROSS-REFERENCE TO RELATED APPLICATIONS

This patent application is a U.S. National Phase Application under 35 U.S.C. § 371 of International Patent Application No. PCT/IB2020/054975, filed on May 26, 2020, which claims priority from European patent application no. 19180113.3 filed on Jun. 13, 2019, all of which are incorporated by reference, as if expressly set forth in their respective entireties herein.

TECHNICAL FIELD

The present invention relates to a rotor for a hover-capable aircraft, such as, for example, a helicopter, a convertiplane or a compound helicopter.

In particular, the present invention relates to a rotor for a helicopter.

BACKGROUND ART

Helicopters are known to basically comprise a fuselage, a main rotor positioned on the top of the fuselage and rotatable about its own axis, and a tail rotor located at the end of the fuselage.

In greater detail, each main or tail rotor, in turn, basically comprises:
- a power unit;
- a hub rotatable about the aforesaid axis and equipped with a plurality of blades radially fastened to and projecting from the aforesaid hub; and
- a mast connected to a power unit and operatively connected to the hub to drive it in rotation.

Furthermore, each main rotor comprises a transmission unit interposed between the power unit and the mast and provided with a support box stationary with respect to the mast's axis of rotation and constrained to the helicopter's fuselage.

In particular, the transmission unit support box is constrained to the fuselage by a plurality of rods that are oblique with respect to the mast's axis of rotation and a beam known in the industry as an "anti-torque beam".

Operation of the main rotor represents the most significant source of vibration transmitted to the helicopter, essentially due to the cyclic variation in the aerodynamic load acting on each blade.

In fact, during each complete rotation of the mast, each blade of the main rotor is subjected, in the rotating reference system, to periodic loads at frequencies $\Omega$ and its multiples ($2*\Omega$, $3*\Omega$, etc.), where $\Omega$ is the rotational speed of the mast. In turn, the loads to which the blade is subjected induce variable inertial and structural loads that are also periodic.

More specifically, the aforementioned loads cause forces and moments that vary in time, which are transmitted to the fuselage through the hub and the support structure of the main rotor, deteriorating the comfort of the occupants in the fuselage.

The vibratory loads act on the hub and the mast both axially and orthogonally to the mast's axis of rotation.

Within the industry, it is known that axial vibratory loads acting on the blade of the rotor are only transmitted to the hub and, consequently, to the fuselage, with angular frequencies of $N*\Omega$ and relative multiples thereof, where $\Omega$ is the rotational speed of the mast and N represents the number of blades of the rotor.

Contrariwise, for vibratory loads orthogonal to the mast's axis of rotation in the rotating system, only the harmonics with angular frequencies of $(N+1)*\Omega$, $(N-1)*\Omega$ and multiples thereof are transmitted to the stationary system through the hub, but they are also received by the hub and, consequently, perceived on the fuselage with angular frequencies $N*\Omega$ and related multiples $2*N*\Omega$, $3*N*\Omega$ etc.

From the foregoing, there is a clearly felt need within the industry for limiting transmission from the mast to the fuselage of vibrations with the aforementioned angular frequency, equal to the product of the rotational speed of the mast and the number of blades of the rotor, i.e. $N*\Omega$, which is by far the harmonic with the greatest amplitude.

For this purpose, there are known passive and active attenuating devices, which are adapted to attenuate the transmission of vibrations to the fuselage.

Active attenuating devices are substantially actuators that exert a harmonic force on the hub or the mast that counters the force generating the vibrations.

An example of these active attenuating devices is illustrated in patent application EP-A-2857313, in the name of the same applicant.

This patent application describes the use of a pair of actuators operatively connected to the mast and controllable so as to generate respective counter forces on the mast having components in the plane orthogonal to the mast's axis of rotation.

Further examples of active attenuating devices are described in patent application US-A-2016/0325828 and in patent U.S. Pat. No. 8,435,002.

In addition, US-A1-2013/0011260 describes a vibration reduction device including: an elastic body; a dynamic mass; and a controllable mass. The dynamic mass is supported by an object of vibration reduction through the elastic body. The actuator causes the controllable mass to move with respect to the dynamic mass. Such a vibration reduction device can vary the frequency and the amplitude at which the dynamic mass vibrates with respect to the object of vibration reduction by causing the controllable mass to move appropriately with respect to the dynamic mass, thereby enabling the vibration of the object of vibration reduction to be reduced more reliably. In addition, such a vibration reduction device can reduce vibration of a certain frequency of the object of vibration reduction even when the controllable mass is fixed with respect to the dynamic mass.

Active attenuating devices have the advantage of being able to alter their characteristics according to changes in the vibratory conditions of the hub and the mast.

Passive attenuating devices basically comprise resonating systems equipped with masses suspended from the mast or the hub by an elastic system. The vibration of these suspended masses enables at least partially attenuating the transmission of vibrations to the fuselage. These attenuating devices are normally tuned to a precise vibration frequency to be attenuated, by opportunely selecting the value of the suspended mass and the stiffness of the elastic system.

In some types of helicopters, it is possible to selectively vary the angular speed of rotation of the mast between:
- a first nominal value, which is employed under normal operating conditions of the helicopter; and
- a second value greater than the first value, which is employed under particular operating conditions of the helicopter.

By way of example, the second value is equal to 102% of the first value.

This change in angular speed shifts the angular frequency of the vibratory loads transmitted to the fuselage, making passive resonant absorbers, which are only efficient in a very narrow frequency range centred on the resonant frequency, partially ineffective.

This happens because passive absorbers are normally tuned to the first nominal angular speed value of the mast and are therefore not entirely optimized for attenuating the transmission of vibrations to the fuselage when the mast rotates at the second angular speed.

There is awareness in the industry of the need to attenuate the transmission of axial vibrations to the fuselage in an optimal manner at both the first angular speed and the second angular speed of the mast, as well as at further angular speeds, whilst at the same time preserving the constructional and implementational simplicity of passive absorbers.

DISCLOSURE OF INVENTION

The object of the present invention is to provide a rotor for a hover-capable aircraft that allows satisfying the aforementioned need in a simple and inexpensive manner.

The aforesaid object is achieved by the present invention, in so far as it relates to a rotor for a hover-capable aircraft as defined in claim 1.

BRIEF DESCRIPTION OF THE DRAWINGS

For a better understanding of the present invention, a preferred embodiment is described below, purely by way of non-limitative example and with reference to the accompanying drawings, in which.

BEST MODE FOR CARRYING OUT THE INVENTION

Figure 1:
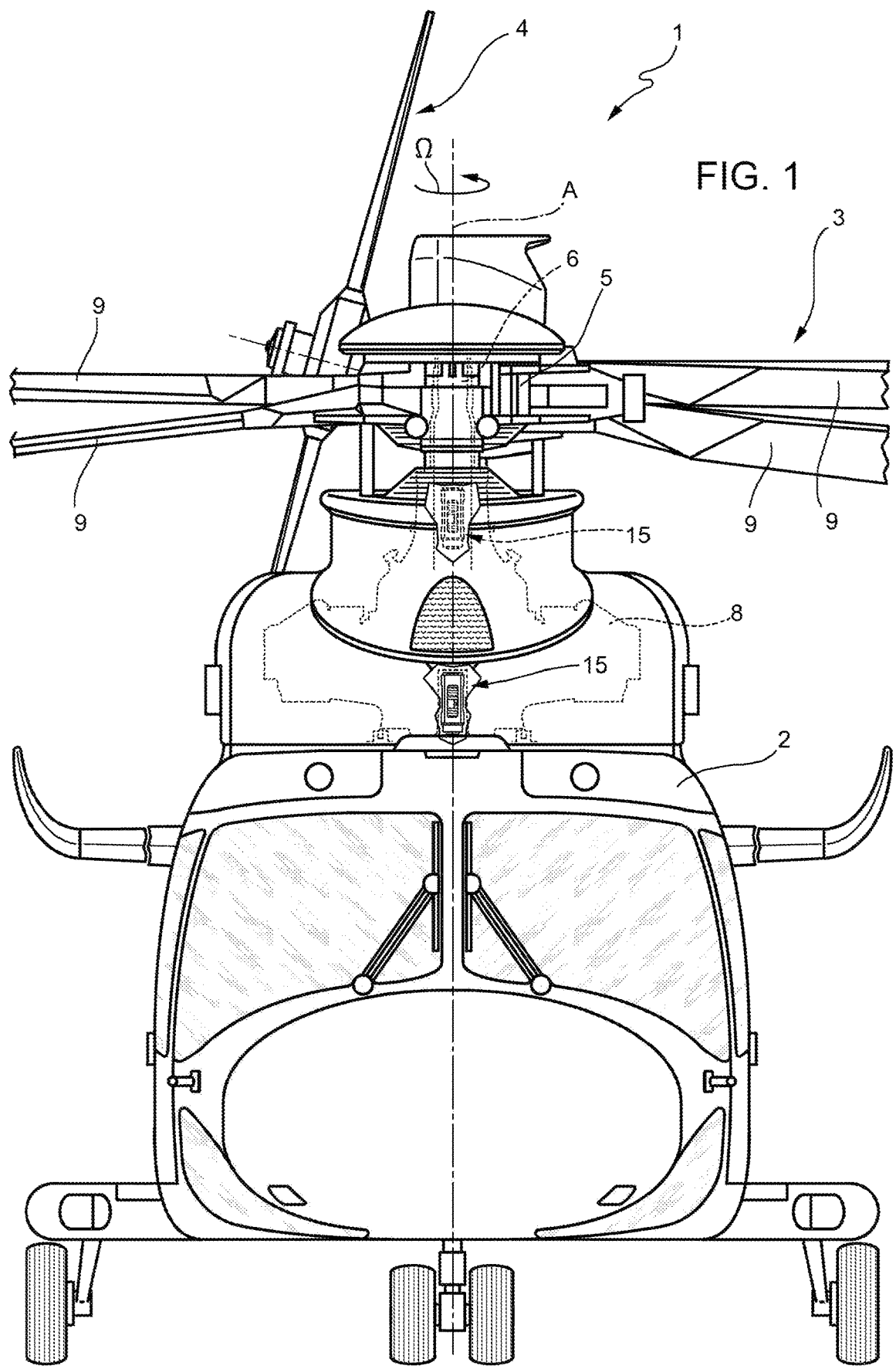
FIG. 1 is a frontal view of a helicopter comprising a rotor according to an embodiment of the present invention, with parts not completely represented for the sake of clarity.

Referring to FIG. 1, reference numeral 1 indicates a hover-capable aircraft, in particular a helicopter, basically comprising a fuselage 2, a main rotor 3 positioned on the top of the fuselage 2 and rotating about an axis A, and a tail rotor 4 located at an end of the fuselage 2 and rotating about an axis of its own, transversal to axis A.

In greater detail, the rotor 3 comprises a hollow hub 5, with axis A, carrying a plurality of cantilever-mounted blades 9, which extend radially to axis A.

Figure 2:
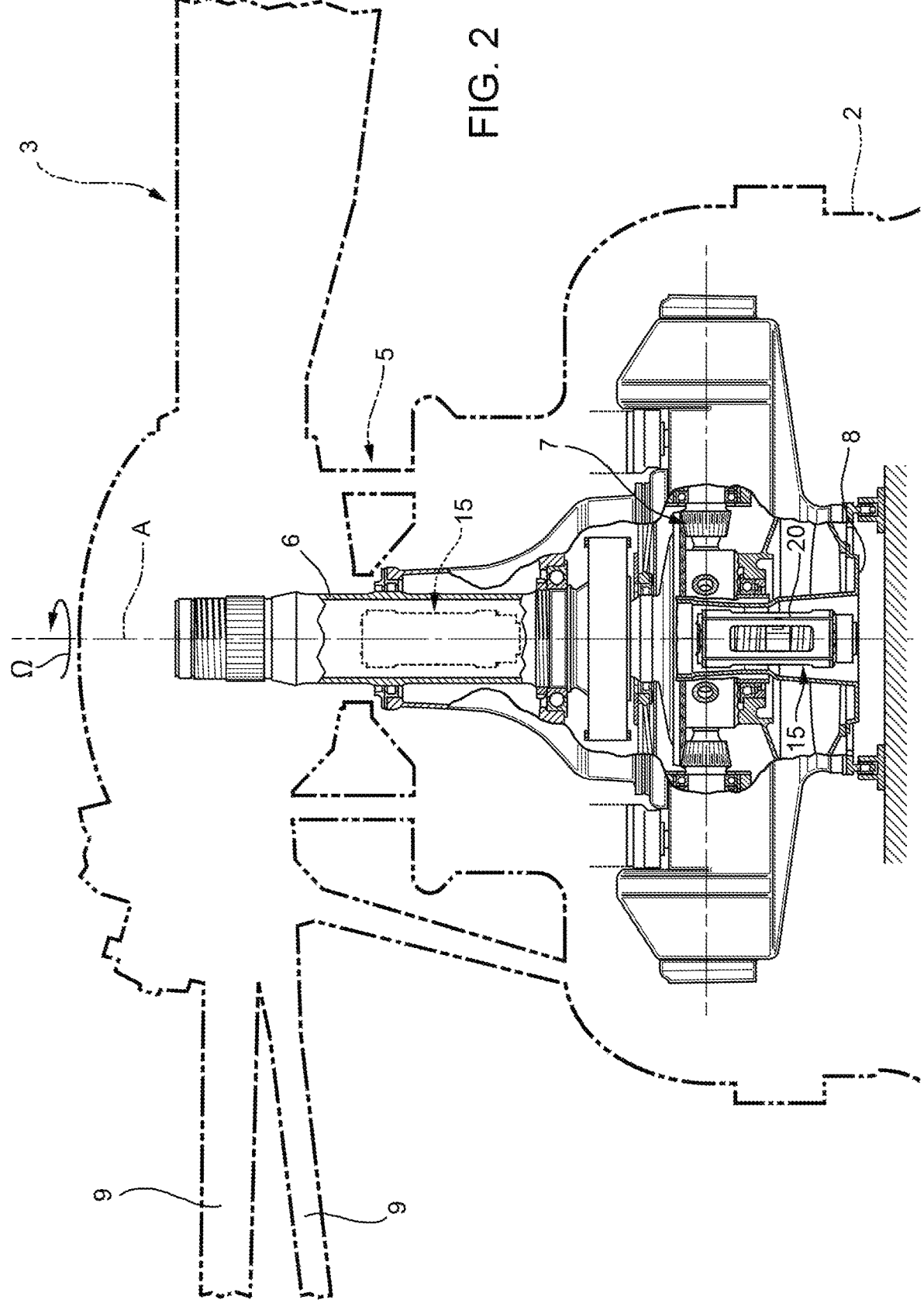
FIG. 2 is a frontal view, on an enlarged scale, of a transmission casing of the rotor in FIG. 1.

Referring to FIG. 2, the rotor 3 also comprises a mast 6, rotating about axis A with an angular speed $\Omega$ with respect to a reference system integral with the fuselage 2, angularly integral with the hub 5, and coupled, in a manner not shown, to a power unit, for example a turbine, carried by the helicopter 1.

The rotor 3 also comprises a transmission unit 7 adapted to transmit motive power from the power unit to the mast 6.

In detail, the transmission unit 7 comprises, in particular, a stator 8 that is stationary with respect to axis A.

The stator 8 is connected to the fuselage 2 in a known manner, for example by an anti-torque beam and a plurality of rods inclined with respect to axis A.

Furthermore, the power unit is selectively controllable so as to drive the mast 6, the hub 5 and the blades 9 in rotation about axis A:

with an angular speed $\Omega$ equal to a nominal value $\Omega 1$, in normal operating conditions of the helicopter 1; or with an angular speed $\Omega$ equal to a value $\Omega 2$ different from the nominal value $\Omega 1$, in particular operating conditions of the helicopter 1.

In the case shown, value $\Omega 2$ is greater than nominal value $\Omega 1$.

More specifically, angular speed $\Omega 2$ is equal to approximately 102% of angular speed $\Omega 1$.

The mast 6 is partly housed inside the hub 5 and is angularly integral with the hub 5 (FIG. 2).

In particular, the mast 6 is hollow.

The rotor 3 also comprises a vibration attenuating device 15 to attenuate the transmission of vibrations to the fuselage 2 parallel to axis A. In other words, the attenuating device 15 attenuates axial vibrations on the mast 6.

In the case shown, the attenuating device 15 is passive and is reconfigurable.

The attenuating device 15 is also coaxial to axis A.

The attenuating device 15 basically comprises (FIGS. 3 to 5):

a casing 20 extending along axis A;

a mass 21 slidable inside the casing 20 parallel to axis A; and elastic means to support the mass 21 in a sliding manner along axis A inside the casing 20.

The elastic means are interposed between the casing 20 and the mass 21 and have an overall stiffness k parallel to axis A.

More specifically, the casing 20 comprises:

a pair of axial end walls 50 and 51 substantially orthogonal to axis A; and a cylindrical wall 52 extending between walls 50 and 51.

The elastic means comprise a pair of springs 23 interposed, at respective mutually opposite axial sides of the mass 21, between the mass 21 and the casing 20.

In the case shown, the springs 23 are helical springs in a "parallel" configuration, i.e. they are subjected to the same deformation during oscillatory motion. It follows that each spring 23 has a stiffness equal to k/2.

One of the springs 23 is interposed between the mass 21 and wall 50 of the casing 20 and the other spring 23 is interposed between the mass 21 and wall 51 of the casing 20.

Advantageously, the attenuating device 15 also comprises:

a further mass 25, also sliding inside the casing 20 parallel to axis A;

a connection element 30, which makes the masses 21 and 25 integrally movable along axis A when the angular speed $\Omega$ of the mast 6 assumes value $\Omega 1$ and an actuator 35, activatable to decouple the masses 21 and 25, with respect to translation along axis A, when the angular speed $\Omega$ of the mast 6 assumes value $\Omega 2$.

In the case shown, the casing 20 is connected to the stator 8.

Alternatively, the casing 20 is housed inside the mast 6, as indicated by the dashed line in FIG. 2. In this embodiment, the attenuating device 15 also comprises a slip-ring adapted to connect a power source positioned on board the fuselage 2 to the actuator 35.

When the angular speed $\Omega$ of the mast 6 assumes value $\Omega 1$, the attenuating device 15 behaves like a tuned mass absorber having mass equal to the sum of masses 21 and 25 and stiffness k along axis A. These mass and stiffness values are determined in such a way that the attenuating device 15 is tuned to an angular frequency equal to $\Omega 1$ and therefore attenuates the transmission of vibrations along axis A with this angular frequency $\Omega 1$ to the fuselage 2.

Contrariwise, when the angular speed $\Omega$ of the mast 6 assumes value $\Omega 2$, the attenuating device behaves like a tuned mass absorber having mass equal to mass 21 and stiffness k along axis A. These mass and stiffness values are determined in such a way that the attenuating device 15 is tuned to an angular frequency equal to $\Omega 2$ and therefore attenuates the transmission of vibrations along axis A with this angular frequency $\Omega 2$ to the fuselage 2.

In greater detail, the connection element 30 is magnetic. More specifically, the masses 21 and 25 are made of a magnetizable material, preferably ferromagnetic.

The connection element 30 is a permanent magnet fastened to mass 21.

In the case shown, the connection element 30 is configured to generate a first magnetic field oriented parallel to axis A.

The connection element 30 also comprises a pair of discs 31 and 32 coaxial with respect to axis A and fastened to mass 21.

The discs 31 and 32 define respective mutually opposite poles of the permanent magnet.

Mass 21 comprises (FIGS. 4 and 5) an axial end 26 arranged on the side near wall 50, receiving the connection element 30 in a stationary manner and defining a shoulder 34, with a truncated-cone shape in the case shown.

Mass 25 comprises an axial end 24 opposite to wall 50 and facing axial end 26 of mass 21.

More specifically, axial end 24 comprises:
a shoulder 28 adapted to abut against shoulder 34 when the angular speed $\Omega$ of the mast 6 is equal to value $\Omega 1$; and
a shoulder 29, which is axially opposite to shoulder 28. In the case shown, shoulder 28 has a truncated-cone shape and shoulder 29 has a flat ring shape.

Figure 3:
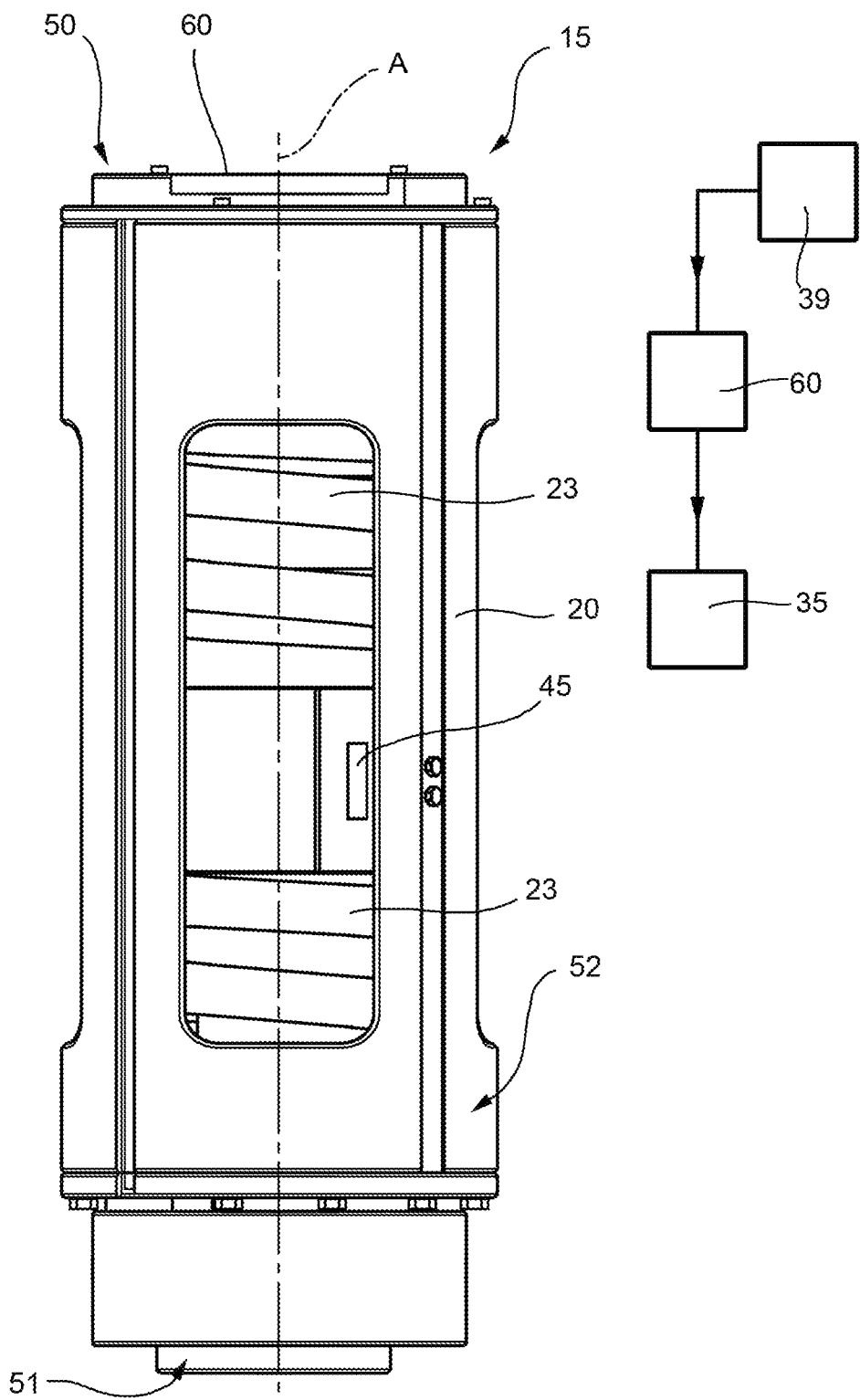
FIG. 3 shows, on an enlarged scale, the attenuating device in FIG. 2.
Figure 4:
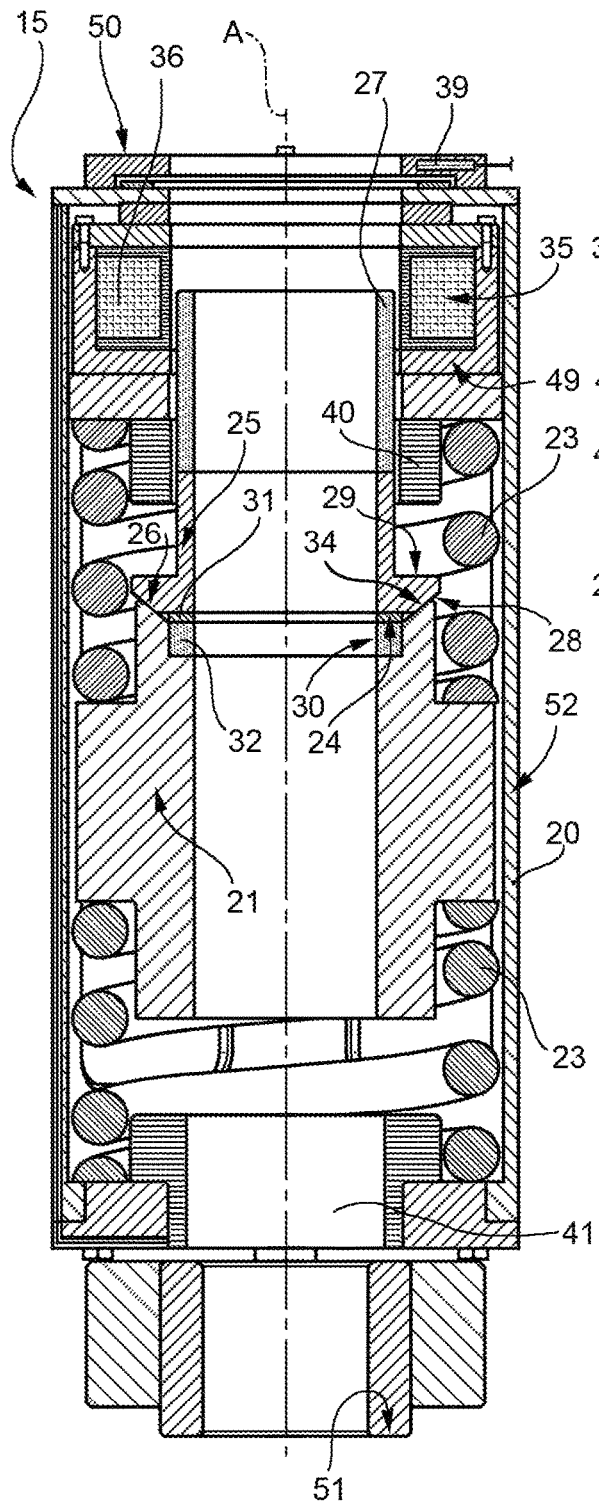
FIGS. 4 and 5 show, on a further enlarged scale, the attenuating device in FIGS. 2 and 3 in respective operating configurations employed when the angular speed of a mast of the rotor assumes, respectively, a first and a second value different from each other.
Figure 5:
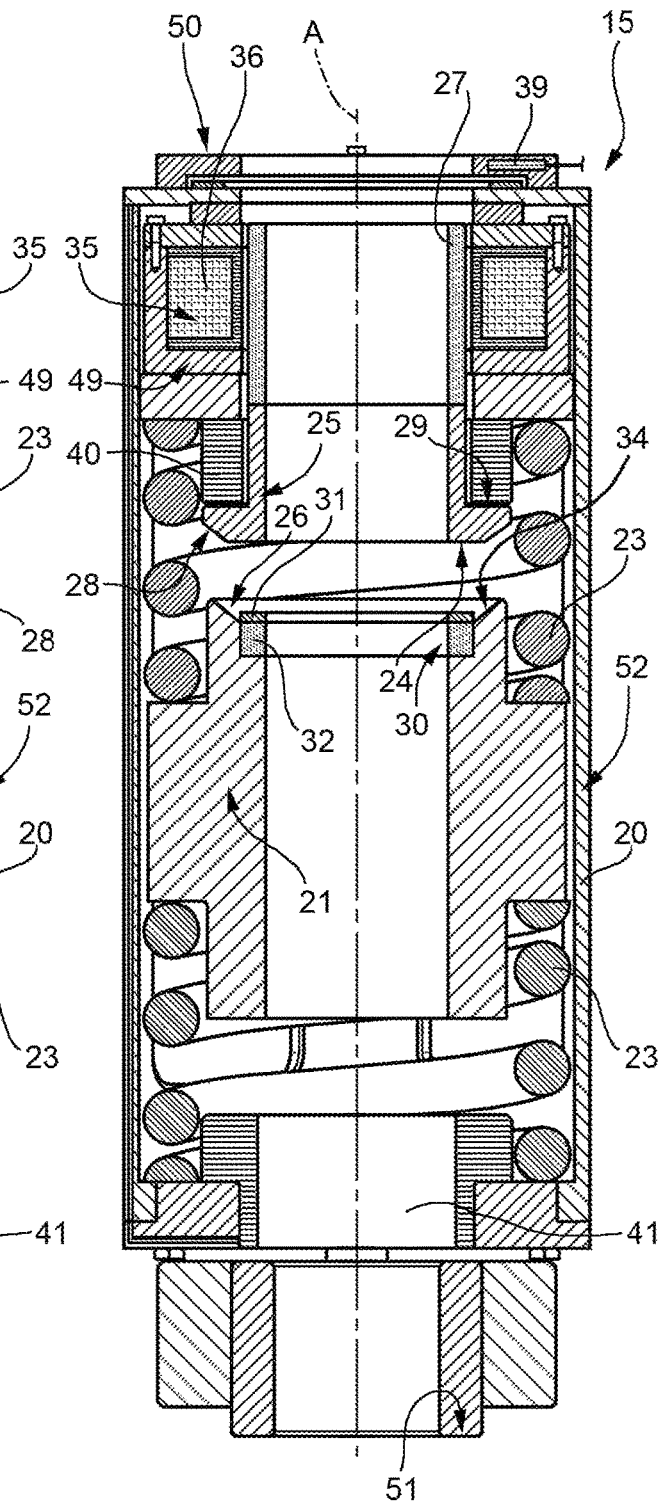

In the configuration shown in FIGS. 4 and 5, the connection element 30 exerts an attractive force Fm on mass 25 that is directed parallel to axis A and oriented in the same direction as the force of gravity, from wall 50 towards wall 51 (i.e. downwards in FIGS. 2 to 5).

In consequence, when the angular speed $\Omega$ of the mast 6 assumes value $\Omega 1$, mass 25 is subjected to the weight force, force Fm and the inertial force. The connection element 30 and mass 25 are sized in such a way that the resultant of the aforementioned forces keeps mass 25 constrained to mass 21.

The actuator 35 is selectively controllable to exert a force Fa on mass 25 that is directed parallel to axis A and oriented in the opposite direction to the force of gravity, from wall 51 towards wall 50 (i.e. upwards in FIGS. 4 and 5).

In consequence, when the angular speed $\Omega$ of the mast 6 assumes value $\Omega 2$, mass 25 is subjected to the weight force, force Fm, the inertial force and further force Fa.

The actuator 35 is sized to generate force Fa with a value such that the resultant of the aforementioned forces exerted on mass 25 is directed from wall 51 towards wall 50 and axially separates mass 25 from mass 21.

In greater detail, the actuator 35 is electromagnetic.
In greater detail, the actuator 35 comprises:
a current generator, which is not shown;
a plurality of toroidal electrical windings 36 (only schematically shown) having an annular shape about axis A; and
a magnetic field generator 27 configured to generate a second magnetic field oriented radially to axis A and integrally defined with mass 25.

In greater detail, the toroidal electrical windings 36 are housed inside a metal armature 49 of ferromagnetic material fastened to the casing 20 and having the function of orienting the magnetic field generated by the generator 27.

The generator 27 is instead movable with respect to the casing 20, parallel to axis A. More specifically, the generator 27 is arranged on the axially opposite part of mass 25 with respect to the end 28 of mass 25.

Activation of the electric generator causes circulation of a current in the electrical windings 36. This electric current circulates annularly with respect to axis A and is immersed in the second magnetic field radial to axis A generated by the generator 27 and linked with the ferromagnetic material of the armature 49.

Due to the effect of the Lorentz force and that the electrical windings 36 are stationary with respect to axis A, force Fa is generated on mass 25.

The attenuating device 15 also comprises a sensor 39 (only schematically shown in FIGS. 4 and 5) adapted to generate a signal associated with the angular speed $\Omega$ of the mast 6 and operatively connected to the actuator 35.

In the case shown, the sensor 39 is fastened to wall 50 of the casing 20.

The attenuating device 15 also comprises a control unit 60 functionally connected to the sensor 39 and the actuator 35, as schematically shown in FIG. 3.

The control unit 60 is, in greater detail, programmed to:
deactivate the actuator 35 when the sensor 39 detects that the angular speed $\Omega$ of the mast 6 assumes value $\Omega 1$ (FIG. 4), so as to keep the masses 21 and 25 integral with each other; and
activate the actuator 35 when the sensor 39 detects that the angular speed $\Omega$ of the mast 6 assumes value $\Omega 2$ (FIG. 5), so as to separate and decouple the masses 21 and 25.

The attenuating device 15 also comprises:
a pair of end of travel elements 40 and 41 stationary with respect to the casing 20 and arranged at respective opposite sides of the masses 21 and 25, and adapted to define respective mutually opposite end stops for the oscillatory motion of the masses 21 and 25; and
a constraint element 45 (FIG. 3) interposed between the casing 20 and mass 21 and designed to prevent the rotation of mass 21 about axis A following torsion of the springs 23 about axis A.

In particular, the end of travel elements 40 and 41 are respectively arranged on the side of walls 50 and 51 with respect to mass 21.

When the angular speed $\Omega$ of the mast 6 is equal to value $\Omega 1$ and the actuator 35 is thus deactivated, the end of travel elements 40 and 41 limit the joint oscillation of the masses 21 and parallel to axis A (FIG. 4).

When the angular speed $\Omega$ of the mast 6 is equal to value $\Omega 2$ and the actuator 35 is thus activated, the end of travel element 40 abuts against shoulder 29 of mass 25, halting the movement away from mass 21 in the direction parallel to axis A (FIG. 5).

In use, the power unit drives the hub 5, mast 6 and blades 9 in rotation about axis A, by means of transmission unit 7.

Operation of the helicopter 1 is described starting from a condition in which the mast 6 rotates about axis A with angular speed Ω equal to nominal value Ω1, with reference to the reference system integral with the fuselage 2.

Rotation of the hub 5 and blades 9 generates vibrations, which would be transmitted to the mast 6 and, from there, to the fuselage 2 of the helicopter 1.

These vibrations mainly have angular frequencies equal to N*Ω1 with respect to the stationary system of the fuselage.

The transmission of these vibrations to the fuselage 2 is attenuated by the attenuating device 15.

In greater detail, the sensor 39 detects the angular speed Ω as being equal to value Ω1 of the mast 6 and the control unit 60 keeps the actuator 35 deactivated. In these circumstances, no electric current circulates in the windings 36.

Mass 25 is kept in contact with mass 21 by the permanent magnet of the connection element 30.

More specifically, mass 25 is subjected to the weight force, the force Fm exerted by the magnet of the connection element 30 and the inertial force due to its own oscillatory motion along axis A. These forces have a resultant oriented so as to keep the masses 21 and 25 in contact with each other.

In these conditions, the masses 21 and 25 and the generator 27 oscillate integrally with each other along axis A and are elastically supported by the springs 23 in their oscillatory motion along axis A.

In consequence, the attenuating device 15 behaves like a tuned mass absorber having mass equal to the sum of masses 21 and 25 and stiffness k along axis A. These mass and stiffness values are determined in such a way that the attenuating device 15 is tuned to an angular frequency equal to Ω1. The attenuating device 15 is therefore efficient in attenuating the transmission of vibrations along axis A with this angular frequency 521 to the fuselage 2.

Oscillation of the masses 21 and 25 along axis A is limited by the end of travel elements 40 and 41 on the side of wall 50 and wall 51, respectively.

The accidental rotation of the masses 21 and 25 about axis A is prevented by the constraint element 45.

In particular flight conditions of the helicopter 1, the power unit drives the mast 6 in rotation about axis A with angular speed Ω equal to value Ω2 with reference to the reference system integral with the fuselage 2.

The vibrations generated by the mechanical and aerodynamic loads associated with the rotation of the mast 6 and hub 5 mainly have angular frequencies equal to N*Ω 2 with respect to the stationary reference system of the fuselage.

In these conditions, the sensor 39 detects the angular speed Ω equal to value Ω2 of the mast 6 and the control unit 60 activates the actuator 35, so as to cause the circulation of electric current in the windings 36 and therefore generate force Fa on mass 25.

More specifically, the electric current circulating in the windings 36 annularly to axis A interacts with the second magnetic field generated by the permanent magnet of generator 27.

As this magnetic field is oriented radially to axis A, a Lorentz force is generated parallel to axis A and equal to force Fa between the windings 36 and mass 25 carrying the permanent magnet of generator 27.

Mass 25 is thus subjected to the weight force, the force Fm exerted by the magnet of the connection element 30 and force Fa.

The resultant of these forces causes mass 25 to move away from mass 21 parallel to axis A until reaching a condition (FIG. 5) in which shoulder 29 of mass 25 abuts against end of travel element 40.

These forces have a resultant oriented from wall 51 towards wall 50 in a direction opposite to the force of gravity. In consequence, this resultant keeps the masses 21 and 25 separated from each other and keeps mass 21 in contact with the actuator 35.

The attenuating device 15 thus behaves like a tuned mass absorber having mass equal to mass 21 and stiffness k along axis A. These mass and stiffness values are determined in such a way that the attenuating device 15 is tuned to an angular frequency equal to Ω2 and therefore attenuates the transmission of vibrations along axis A with this angular frequency Ω2 to the fuselage 2.

Oscillation of mass 21 along axis A is limited by shoulder 28 of mass 25 on the side of wall 50 and by end of travel element 41 on the side of wall 51.

The constraint element 45 ensures that mass 21 cannot rotate about axis A during the oscillatory motion along axis A, for example, due to accidental torsion of the springs 23.

From examination of the characteristics of the rotor 3 according to the present invention, the advantages that can be achieved therewith are evident.

In particular, mass 25 of the attenuating device 15 is integrally movable with mass 21 in the oscillatory motion along axis A when the angular speed Ω of the mast 6 is equal to nominal value 521. Contrariwise, mass 25 of the attenuating device 15 is separate and decoupled from mass 21 when the angular speed Ω of the mast 6 is equal to value Ω2, different from nominal value Ω1.

In consequence, the attenuating device 15 behaves like a tuned mass absorber having mass equal to the sum of masses 21 and 25 and stiffness k along axis A when the mast 6 and blades 9 rotate at angular speed Ω1 equal to the nominal value. In this condition, the attenuating device 15 is tuned to angular frequency Ω1 and is therefore able to efficiently attenuate the transmission of vibrations with angular frequency Ω1 to the fuselage 2, raising passenger comfort.

Contrariwise, the attenuating device 15 behaves like a tuned mass absorber having mass equal to just mass 21 and stiffness k along axis A when the mast 6 and blades 9 rotate at an angular speed Ω2 different from the nominal value. In this condition, the attenuating device 15 is tuned to angular frequency Ω2 and is therefore able to efficiently attenuate the transmission of vibrations with angular frequency Ω2 to the fuselage 2, raising passenger comfort even when the rotor 3 rotates at angular speed Ω2 greater than the nominal value.

The connection element 30 is effective in keeping masses 21 and 25 constrained to each other in an integral manner with respect to oscillation along axis A when the mast 6 and blades 9 rotate at angular speed Ω1 equal to the nominal value.

The actuator 35 is effective in exerting a force Fa on mass 25 such as to overcome the action of force Fm exerted by the connection element 30 when the sensor 39 detects that the mast 6 and blades 9 rotate at angular speed Ω2, different from the nominal value.

The end of travel elements 40 and 41 define respective mutually opposite stop surfaces for the oscillatory motion of the masses 21 and 25 when the angular speed Ω is equal to value Ω1 and the actuator 35 is deactivated.

End of travel element 40 axially constrains mass 25 and substantially prevents axial oscillation when the angular speed Ω is equal to value Ω1 and the actuator 35 is deactivated.

The constraint element 45 effectively prevents rotation of mass 21 about axis A, caused, for example, by torsion of the springs 23.

Finally, it is clear that modifications and variants can be made regarding the rotor 3 described and illustrated herein without departing from the scope defined by the claims.

In particular, the rotor 3 could also comprise a plurality of further masses 25 selectively connectable to mass 21 when the angular speed Ω of the mast 6 is equal to further respective values, so as to tune the attenuating device 15 to respective further values.

Instead of being used on a helicopter 1, the rotor 3 could be used on a convertiplane or a gyrodyne or a compound helicopter.

Moreover, the rotor 3 could comprise a further vibration attenuating device 15 to attenuate the transmission of vibrations to the fuselage 2 in a plane orthogonal to axis A, i.e. associate with flexural vibrations of the mast 6.

Finally, the rotor according to the present invention could be the tail rotor 4 of the helicopter 1 instead of the main rotor 3.

The invention claimed is:

1. A rotor (3) for a hover-capable aircraft (1), comprising:
   a hub (5) rotating about an axis (A) and, in turn, comprising a plurality of blades (9);
   a mast (6) connectable to a power unit of said aircraft (1) and operatively connected to said hub (5) to drive said hub (5) in rotation about said axis (A); and
   an attenuating device (15) to attenuate the transmission of vibrations from said mast (6) to said aircraft (1) parallel to said axis (A);
   said attenuating device (15), in turn, comprising:
      a casing (20); —a first mass (21) free to oscillate parallel to said axis (A) with respect to said casing (20) and elastically connected to said casing (20);
   characterized in that said attenuating device (15) is passive and further comprises:
      a second mass (25);
      connection means (30) adapted to make said first and second masses (21, 25) integrally movable along said axis (A) when an angular speed (Ω) of said mast (6) assumes a first value (Ω1); and
      actuator means (35) activatable to decouple and separate said first and second masses (21, 25) with respect to translation along said axis (A) when said angular speed (Ω) of said mast (6) assumes a second value (Ω2), different from said first value (Ω1);
   wherein said attenuating device (15) is angularly integral with said mast (6);
   wherein said mast (6) is hollow and in that said attenuating device (15) is housed inside said mast (6).

2. The rotor according to claim 1, characterized in that said connection means (30) comprises a magnet that is adapted to connect the said first and second masses (21, 25) together with a first force value of a first force (Fm).

3. The rotor according to claim 2, wherein the magnet comprises a permanent magnet constrained to said first mass (21).

4. The rotor according to claim 2, wherein said actuator means (35) comprise an electromagnetic actuator, which is controllable to exert a second force value (Fa) of a second force on said second mass (25) when said angular speed (Ω) of said mast (6) assumes said second value (Ω2).

5. The rotor according to claim 4, wherein said first and second forces oppose each other;
   said first and second force values (Fm, Fa) being such as to maintain, in use, said second mass (25) integral with said first mass (21) when said angular speed (Ω) assumes said first value (Ω1), and to separate, in use, said second mass (25) from said first mass (21) when said angular speed (Ω) assumes said second value (Ω2).

6. The rotor according to claim 4, wherein said actuator (35), in turn, comprises:
   a plurality of electrical conductors (36) arranged annularly about said axis (A) and inside which an electric current can selectively circulate; and
   a generator (27) configured to generate a magnetic field radial to said axis (A), in particular a permanent magnet;
   said second mass (25) defining said generator (27).

7. The rotor according to claim 1, wherein said attenuating device (15) further comprises a sensor (39) configured to generate a signal associated with a rotational speed of said mast (6);
   said actuator means (35) being controllable on the basis of said signal.

8. The rotor according to claim 1, wherein said attenuating device (15) further comprises:
   at least one spring (23) interposed between said casing (21) and said first mass (21); and
   an anti-rotation device (45) interposed between said at least one spring (23) and said first mass (21), and adapted to prevent the rotation of said first mass (21) about said axis (A).

9. The rotor according to claim 1, it wherein the rotor comprises a first end of travel device (40) and a second end of travel device (41) adapted to respectively limit the travel of said first mass (21) and of second mass (25) integral with one another when the angular speed (Ω) of said mast (6) assumes, in use, said first value (Ω1); said first end of travel device (40) being arranged in abutment against said second mass (25) axially spaced apart from said first mass (21) when the angular speed (Ω) of said mast (6) assumes, in use, said second value (Ω2).

10. The rotor according to claim 1, wherein said attenuating device (15) is angularly stationary with respect to said axis (A).

11. The rotor according to claim 10, wherein the rotor comprises a stator (8) supporting said mast (6) in a rotatable manner about said axis (A); said attenuating device (15) being fastened to said stator (8).

12. The rotor according to claim 1, wherein said first and second masses (21, 25) comprise respective axial ends (26, 28) facing each other and of matching shape;
   said axial end (26) of said first mass (21) further housing said connection means (30).

13. The rotor according to claim 1, wherein said casing (20) comprises a first end wall (50) and a second end wall (51), which are substantially orthogonal to said axis (A) and a cylindrical wall (52) extending between said first end wall (50) and said second end wall (51);
   said first mass (21) comprising a first axial end (26) arranged on the side near said first end wall (50), receiving said connection means (30) in a stationary manner and defining a shoulder (34); said second mass (25) comprising a second axial end (24) opposite to said first end wall (50) and facing first axial end (26) of said first mass (21).

14. A hover-capable aircraft (1) comprising:
   a fuselage (2); and
   a rotor (3) according to claim 1;
   said fuselage (2) being connected in a direct or indirect manner to said casing (20) of said attenuating device (15).

15. A rotor (3) for a hover-capable aircraft (1), comprising:
- a hub (5) rotating about an axis (A) and, in turn, comprising a plurality of blades (9);
- a mast (6) connectable to a power unit of said aircraft (1) and operatively connected to said hub (5) to drive said hub (5) in rotation about said axis (A); and
- an attenuating device (15) to attenuate the transmission of vibrations from said mast (6) to said aircraft (1) parallel to said axis (A);

said attenuating device (15), in turn, comprising:
- a casing (20);
- a first mass (21) free to oscillate parallel to said axis (A) with respect to said casing (20) and elastically connected to said casing (20);

characterized in that said attenuating device (15) is passive and further comprises:
- a second mass (25);
- connection means (30) adapted to make said first and second masses (21, 25) integrally movable along said axis (A) when an angular speed ($\Omega$) of said mast (6) assumes a first value ($\Omega1$); and
- actuator means (35) activatable to decouple and separate said first and second masses (21, 25) with respect to translation along said axis (A) when said angular speed ($\Omega$) of said mast (6) assumes a second value ($\Omega2$), different from said first value ($\Omega1$);

wherein said attenuating device (15) further comprises:
- at least one spring (23) interposed between said casing (21) and said first mass (21); and
- an anti-rotation device (45) interposed between said at least one spring (23) and said first mass (21), and adapted to prevent the rotation of said first mass (21) about said axis (A); and wherein said attenuating device (15) further comprises:
- a first end of travel device (40) and a second end of travel device (41) adapted to respectively limit the travel of said first mass (21) and of said second mass (25) integral with one another when the angular speed (S2) of said mast (6) assumes, in use, said first value ($\Omega1$);

said first end of travel device (40) being arranged in abutment against said second mass (25) axially spaced apart from said first mass (21) when the angular speed ($\Omega$) of said mast (6) assumes, in use, said second value ($\Omega2$);

said first and second end of travel devices (40, 41) being stationary with respect to said casing (20) and being arranged at respective opposite sides of said first and second masses (21, 25); said anti-rotation device (45) being further adapted to prevent the rotation of said second mass (25) about said axis (A).

\* \* \* \* \*